(Model.)

2 Sheets—Sheet 1.

J. J. C. SMITH.
BRISTLE SETTING APPARATUS.

No. 276,488.  Patented Apr. 24, 1883.

Witnesses:
T. Walter Fowler,
L. M. Hopkins.

Inventor:
J. J. C. Smith
By Knight Bros.
Attorneys.

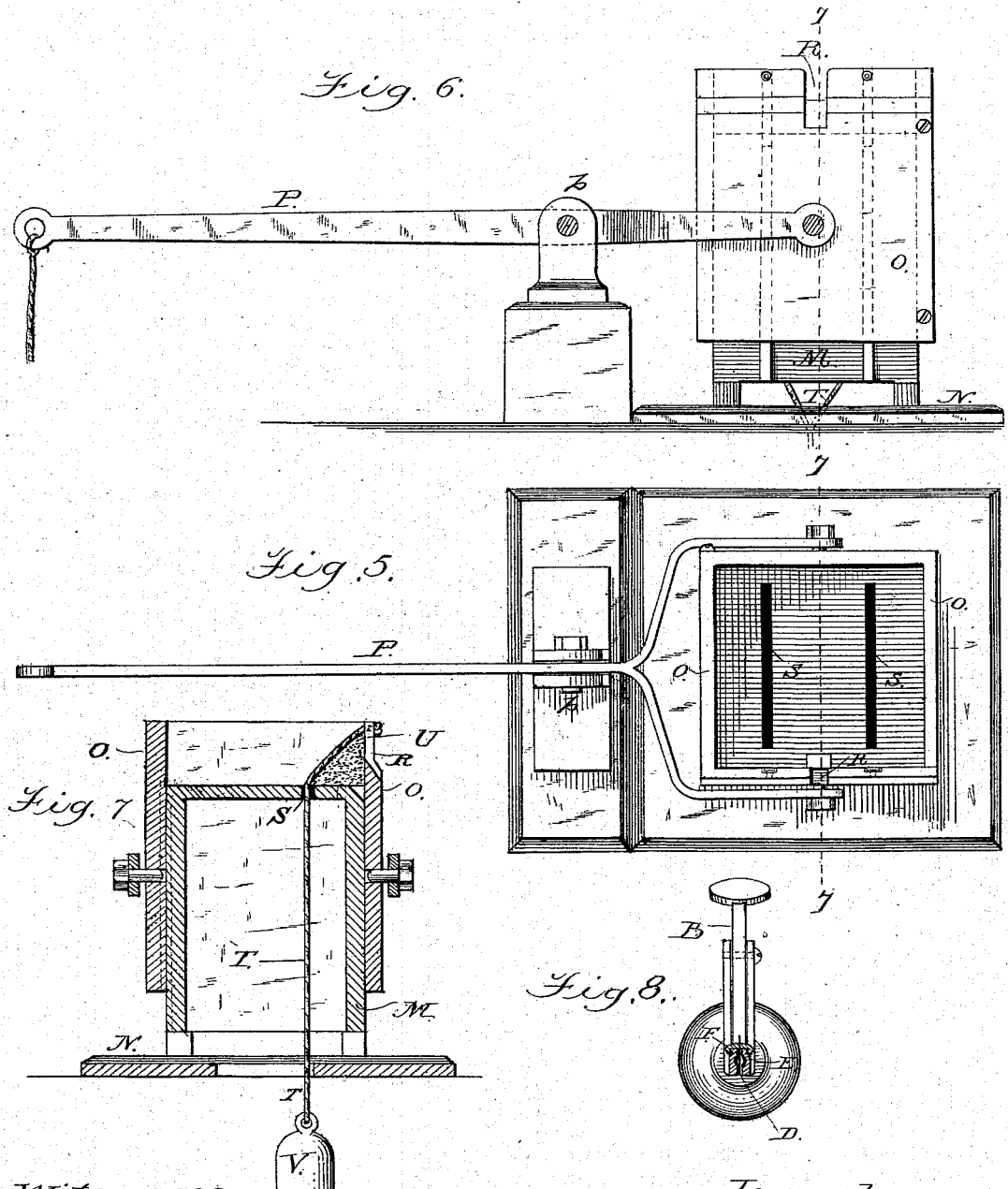

UNITED STATES PATENT OFFICE.

JOHN J. C. SMITH, OF COLLEGE POINT, ASSIGNOR TO THE ANSONIA RUBBER COMPANY, OF NEW YORK, N. Y.

BRISTLE-SETTING APPARATUS.

SPECIFICATION forming part of Letters Patent No. 276,488, dated April 24, 1883.

Application filed August 24, 1881. Renewed March 27, 1883. (Model.)

*To all whom it may concern:*

Be it known that I, JOHN JOSEPH CHARLES SMITH, a citizen of the United States, residing at College Point, in the county of Queens and State of New York, have invented Improvements in Machinery for Setting Tufts of Bristles in Brushes, of which the following is a specification.

The subject of this invention is a tool or hand apparatus used in connection with a machine for holding a quantity of bristles and presenting them in such shape that by means of the tool first referred to uniform or nearly uniform bunches can be drawn from the holder, doubled into tufts, and inserted in the brush back or body rapidly and effectively, as hereinafter described.

Figure 1:
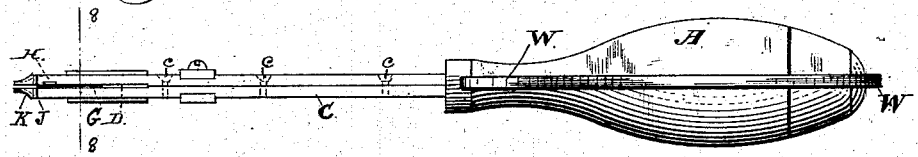
Figure 2:
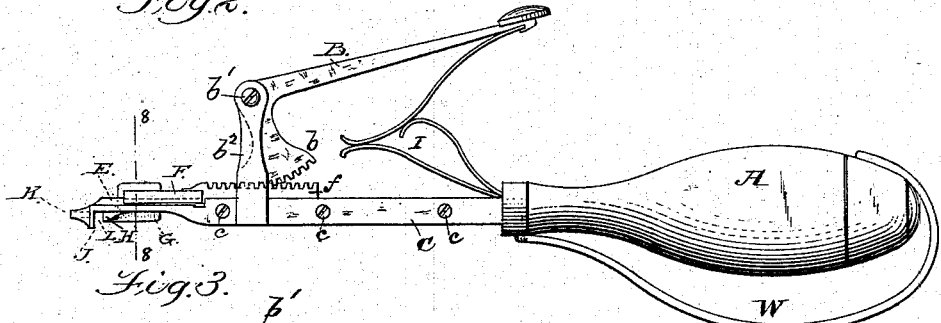
Figure 3:
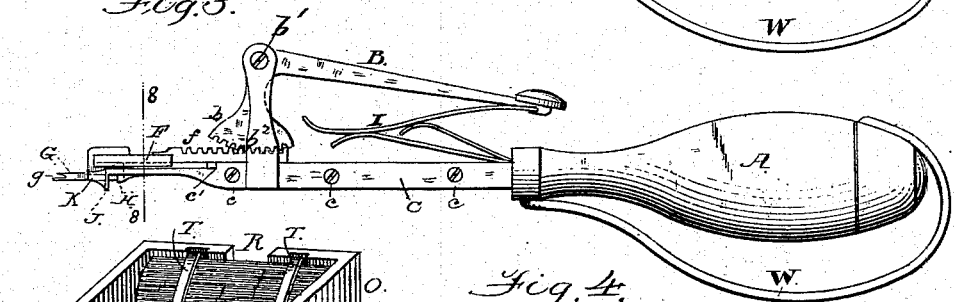
Figure 4:
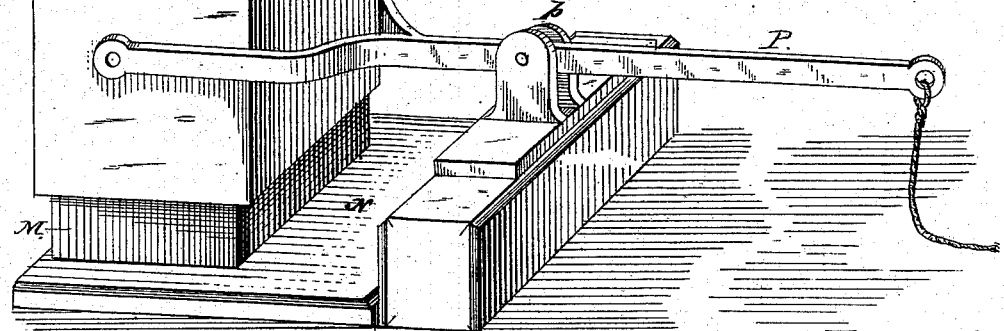

In the accompanying drawings, Figure 1 is a bottom view of the tool for drawing the bunches from the holder and forming them into tufts. Fig. 2 is a side view of the same, showing the parts in their normal position, ready for use. Fig. 3 is a side view, representing the lever depressed and the forked needle, hereinafter described, projected forward, as when it has done its work. Fig. 4 is a perspective view of the apparatus for containing a quantity of bristles and presenting them for the action of the bunching-tool. Fig. 5 is a top view thereof. Fig. 6 is a side elevation of the same. Fig. 7 is a transverse section thereof on the line 7 7, Figs. 5 and 6. Fig. 8 is a transverse section of the setting-tool on the line 8 8, Figs. 1, 2, and 3.

The tool for drawing bunches of bristles from the containing apparatus or holder, doubling them into tufts, and inserting them in the brush-back is made with a shank, C, preferably consisting of two steel bars connected together by screws c, as shown in Fig. 1, and fixed in a handle, A, which is provided with a strap, W, to pass around the fingers. In the forward end of this duplex shank C is a thin longitudinal slit or opening, D, extending from the extremity backward to a sufficient distance to receive and guide a forked bar, G, which is slid longitudinally therein to seize small bunches of bristles and form them into tufts, as hereinafter described. The back or top of the bar C is formed with a dovetailed gib or guide, E, upon which works a corresponding slide, F, provided with a rack, *f*, with which gear the teeth of a cogged segment, *b*, formed on the end of an L-shaped lever B, operated by the thumb to move the slide F outward, said lever being fulcrumed at *b'* to standards *b²*, fixed to the bars C. The slide F carries a thin bar or needle, G, having a forked extremity, and working within the slit D, which is provided for it in the forward end of the bar C, as before described.

Springs I are employed to throw up the lever B, so as to retract the slide F and needle G when said lever B is released; but this backward movement is limited by the rear extremity of the slide F coming in contact with the shoulder *c'* on the bar C, at which time the forked end *g* of the needle is masked by a stud or projection, H, on the side of the bar C.

On the extremity of the bar C is a nozzle, K, projecting downward, so that its rear face will form a hook, J, opposed to the stud H, and leaving a notch or opening, L, between them. The nozzle K is cone-shaped on its exterior, and has a conical aperture extending through it, the smaller or forward end of said aperture being slightly larger than the hole in the brush-back in which the tuft is to be inserted. The nozzle K is divided by the slit D, thereby permitting the needle G to pass through the center of the conical opening in said nozzle.

The size of the bunch of bristles to be taken from the large bundle, held and presented by the apparatus shown in Figs. 4, 5, 6, and 7, and hereinafter described, is regulated by the space L between the hook J and the stud H, the said space L forming a notch on the under side of the shank or bar C.

The apparatus for holding a quantity of bristles and presenting them in proper shape to permit the tool above described to take uniform or nearly uniform bunches therefrom is shown in Figs. 4 to 7, inclusive. It consists of a box or block, M, preferably hollow, mounted on a platform, N, on the outside of which box is a sleeve, O, movable vertically by means of a lever, P, fulcrumed at *p*. The top of the sleeve O is provided on one side with a notch, R. The block M is provided on top with two narrow slots, S S. Wires or cords T T are fastened to the top of the sleeve O, on each side of the notch R, and pass over a bunch of bristles, as shown at U, indefinite in quantity, and downward through the slots S S in the block M, and through an opening prepared for them in the platform N, and are attached to a weight, V, beneath said platform. A suitable spring may be used instead of the weight; or by using elastic cords they may constitute their own spring. A simple weight is, however, the best device for the purpose, excepting where special circumstances may render it undesirable.

Operation: A bundle of bristles, U, cut to the length used for brushes, is placed inside the sleeve O, resting on top of stationary block M, the wires T having been first drawn up to form two loops, under which the bundle of bristles is laid. The weight V draws the wires over the bundle with a uniform, moderate pressure and holds them in position against the wall of the sleeve, as shown at U in Fig. 7. The sliding sleeve is for the purpose of moving the horizontal bundle of bristles in a vertical direction, so as to impart a rolling motion to the bristles against each other, which rolling motion serves to keep them parallel. This motion is imparted by raising and dropping the sleeve. The wires or cords, being attached to the sleeve, will be drawn up, and the weight, in its effort to bring the wires or cords to vertical lines, causes them to press the bristles against the wall of the sleeve. The bristles are thus drawn up in a sheet-like mass and presented at the notch R in a sharp angle, thereby greatly facilitating the taking of small and uniform bunches by the hand setting-tool shown in Figs. 1 to 4, as will be more particularly described. Furthermore, the motion of the sleeve keeps the bundle of bristles at all times in a uniform, compact mass, which is necessary in order that the small bunches taken in succession by the setting-tool may be of uniform size. The bristle-holding apparatus having been charged with a bundle of bristles, as described, the filling of a brush-handle with tufts is effected in the following manner: The setting-tool is held with the right hand by passing the last three fingers through the strap W, leaving the forefinger and thumb free to operate the lever B, so as to move the slide F. The brush-handle is held in the left hand, presenting the holes to be filled toward the right hand. This done, the sleeve O is raised by depressing the lever P, which movement will draw the bundled bristles into a sheet-like mass, presenting the same at notch R in a sharp, angular form. The setting-tool is then brought at right angles to the bristles into the notch R, the handle A being depressed, so that the bar C is at an angle of about forty-five degrees to the wall of the sleeve. The extremity of the bar C is inserted in the notch R just far enough to bring the space L over the edge of the bundle and cause the hook J to take hold of this thin edge. A slight downward pressure on the setting-tool forces the bristles into the space or notch L, which, when filled, will contain just bristles enough to make a regular tuft for a brush. As soon as this is done the lever B is partially depressed, so as to force the thin forked sliding bar or needle G forward halfway of its stroke. The forward movement of the forked bar will at once intercept and hold the bristles lodged in the space or notch L, so that they may be detached from the large bundle without disturbing the same. Furthermore, the needle-bar G will double or bend the bunch of bristles as it enters the orifice of the nozzle K, and carry the doubled bunch into the said orifice. The semi-depression of the lever B carries the bunch through the nozzle K only so far as to form a short rounded tuft at the mouth thereof, which tuft will readily enter a hole in the brush-handle. As soon as the operator has entered the tuft in the hole of the brush-handle the lever B is completely depressed, sending the bunch still farther into the hole and to its regular required depth, the extremity of the nozzle being of course pressed firmly against the brush-handle during this operation. When the tuft is set in its place the lever B is released and the forked bar or needle is withdrawn by the action of the springs I, and the setting-tool is removed, the tuft being held in its socket in the brush-handle sufficiently to draw it completely through the nozzle K. The described operation is repeated with every tuft or bunch to be set in the brush. When all the holes in a brush-handle are thus filled the several tufts are permanently fastened at one operation by means of a cement filled into the hollow brush-handle, as I described in Letters Patent No. 220,947, granted to me the 28th of October, 1879.

The advantages which are derived by the use of the above-described bunch-setting and bristle-holding machines are such that a girl can by eight or ten days' practice acquire the skill to set about eight hundred bunches per hour in a fine first-quality brush, which is fully twice the amount set by skilled brush-makers doing the work by hand or with the aid of devices now in use for the purpose, besides doing the work with greater ease and with much less exertion.

Having thus described my invention, the following is what I claim as new therein and desire to secure by Letters Patent:

1. The shank C and hollow conical nozzle K, formed with a hook or shoulder, J, in combination with the operating-lever B, slide F, and the forked needle G, formed and adapted, as herein described, to grip a suitable bunch of bristles against the shoulder J, and subsequently drive it through the hollow conical nozzle.

2. The combination of the split bar or shank C, the sliding forked bar G, the hollow nozzle K, the hook J, and stud H, forming a notch, L, for gaging the bunch of bristles, substantially as described.

3. The combination of the shank C, nozzle

K, lever B, slide F, rack $f$, and forked bar or needle G, substantially as and for the purposes set forth.

4. The combination of the box or standard M and sleeve O, having relative vertical movement, and the wires or cords T, exerting a yielding pressure on the bunch of bristles U, substantially as and for the purposes set forth.

5. The combination of the box or standard M, the sleeve O, notched at R, wires or cords T, and a spring or weight, V, for compressing the bunch of bristles within the sleeve, and lever P for moving said sleeve up and down, substantially as described.

6. The apparatus for bunching and setting bristles, consisting of the notched sleeve O, plunger M, compressing wires or cords T, and the gripping-tool A B C F G K, substantially as described.

JOHN JOS. CHAS. SMITH.

Witnesses:
  JAS. F. WIRCAIN,
  GEORGE RAAB.